No. 840,519. PATENTED JAN. 8, 1907.
R. RUSSELL.
CAR TRUCK.
APPLICATION FILED SEPT. 8, 1905.
2 SHEETS—SHEET 1.
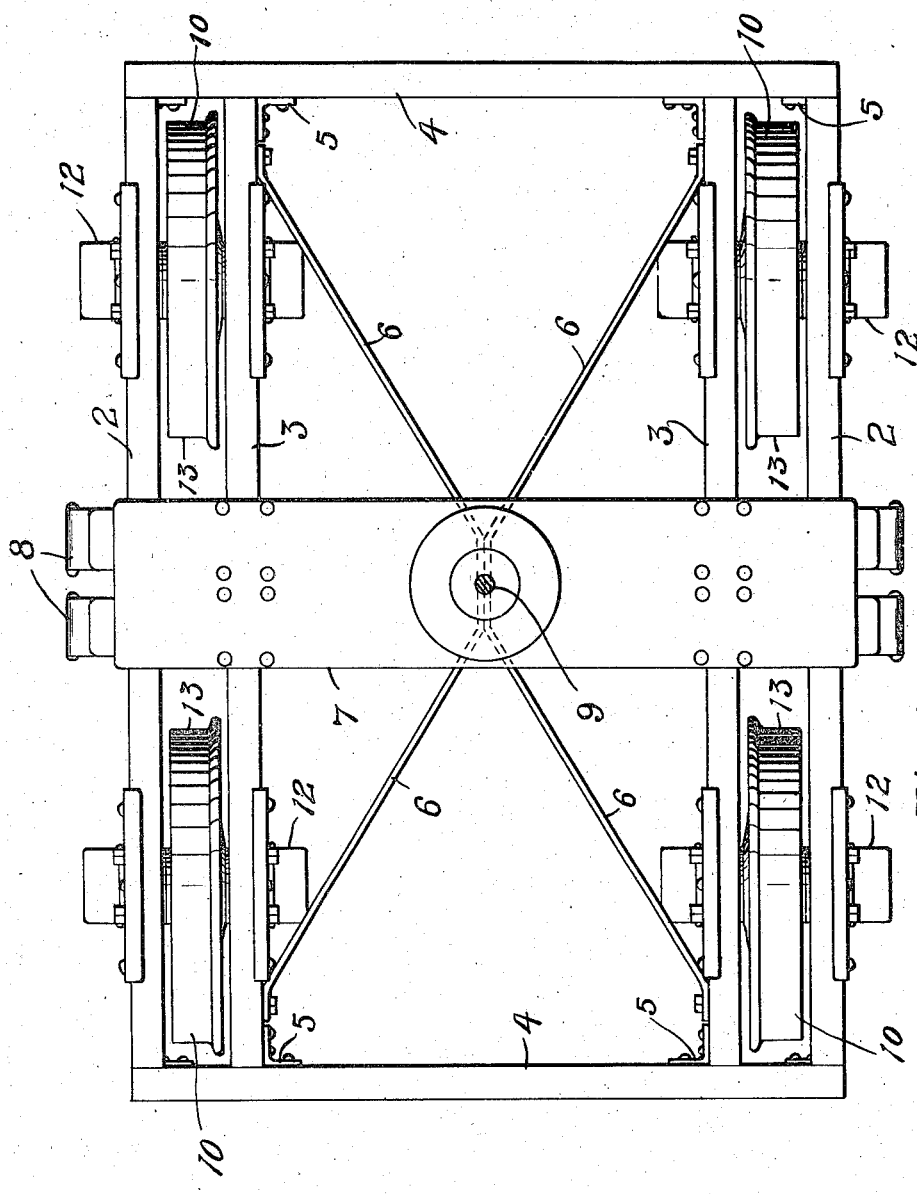
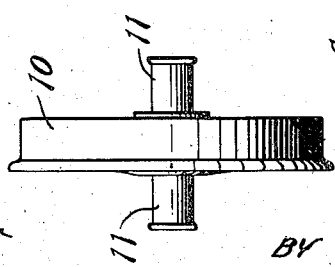
WITNESSES.
INVENTOR
READ RUSSELL
BY
HIS ATTORNEYS.

No. 840,519. PATENTED JAN. 8, 1907.
R. RUSSELL.
CAR TRUCK.
APPLICATION FILED SEPT. 8, 1905.

2 SHEETS—SHEET 2.

WITNESSES.

INVENTOR
READ RUSSELL.
BY
HIS ATTORNEYS.

UNITED STATES PATENT OFFICE.

READ RUSSELL, OF WARREN, ILLINOIS.

CAR-TRUCK.

No. 840,519.     Specification of Letters Patent.     Patented Jan. 8, 1907.

Application filed September 8, 1905. Serial No. 277,510.

*To all whom it may concern:*

Be it known that I, READ RUSSELL, of Warren, county of Jo Daviess, State of Illinois, have invented certain new and useful Improvements in Car-Trucks, of which the following is a specification.

The object of my invention is to provide a truck which will run easier or with less power than the ordinary truck.

A further object is to provide a truck which can be run round curves with less friction between the wheels and rails.

A further object is to provide a car-truck having wheels which have no tendency to separate or spread the rails while running over them.

The invention consists generally in a car-truck provided with wheels having axles journaled on both sides of the wheel on each side of the truck, the axle of each wheel being movable independently of the corresponding axle on the opposite side.

Further, the invention consists in providing a truck with wheels having flat bearing surfaces or treads to rest upon the rails.

Further, the invention consists in various constructions and combinations, all as hereinafter described, and particularly pointed out in the claims.

Figure 2:
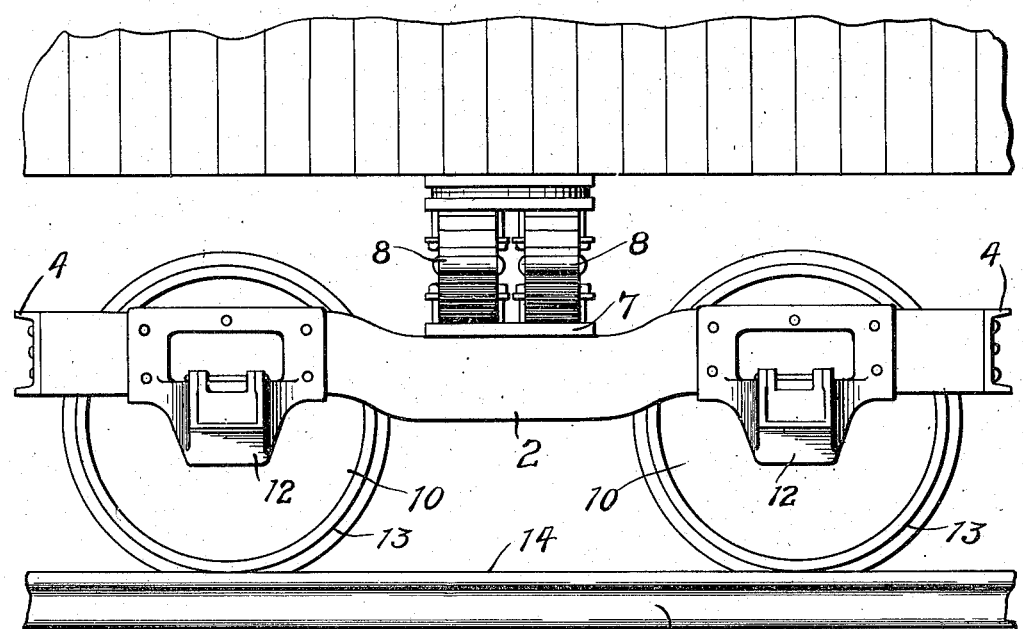
Figure 3:
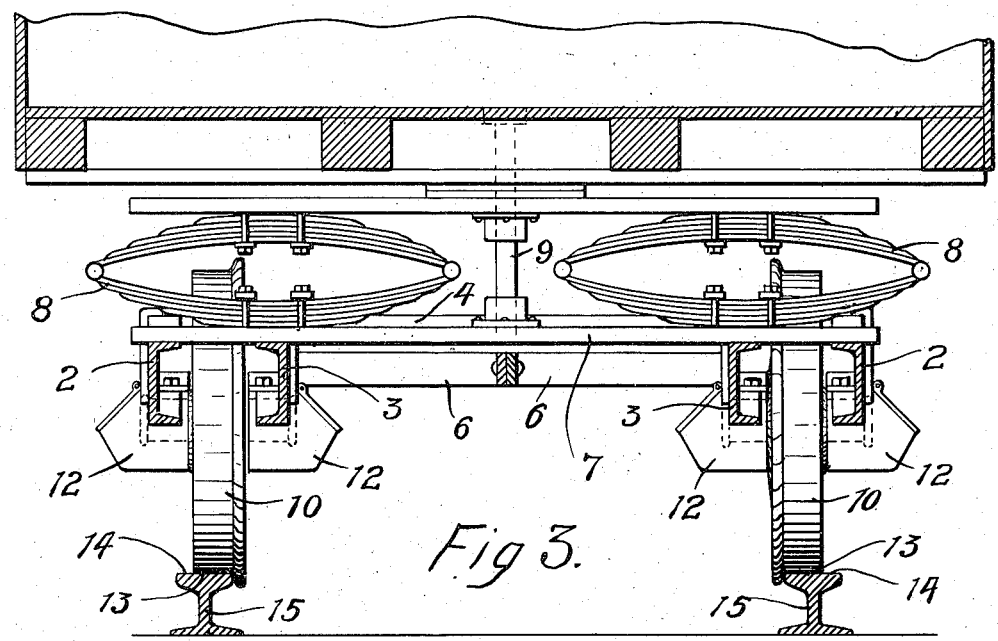

In the accompanying drawings, forming part of this specification, Figure 1 is a plan view of a truck embodying my invention. Fig. 2 is a side elevation of the same. Fig. 3 is a transverse vertical section, and Fig. 4 is a plan view, of one of the wheels and its axle removed from the truck.

In the drawings, 2 and 3 represent the side rails of the truck arranged in pairs upon each side with a sufficient space between them to accommodate the wheels. Cross-bars 4 connect the rails at the ends of the truck, suitable angle-brackets 5 being provided at the intersection of the rails and cross-bars, securing them together and bracing the truck securely at that point. These rails and cross-bars are preferably made of channel bar-iron on account of its strength and rigidity, the flanges of the side rails being on the inside or contiguous to the wheels, as shown in Fig. 3. Braces or truss-rods 6 are bolted at their ends to the intermediate rails 3 and are secured together at the middle of the truck beneath the bolster 7, which is provided with suitable springs, such as 8, and the usual king-bolt 9.

The wheels 10 are provided with short axles 11, journaled on each side of the wheels in boxes 12, which are bolted to the rails 2 and 3 and depend below the same, as shown in Fig. 3. Each axle is thus independent of all the others and with its wheel can turn without affecting the other wheels and axles. When, therefore, the truck is rounding a curve in the track the wheels on the outside can travel faster than those on the inside without increasing the friction between the wheels and the rails. Furthermore, each wheel having bearings on each side of the truck will run more uniformly and the wear in the bearings will be less perceptible than where a single axle extending across the truck is provided for each pair of wheels. The wheels are all provided with flat bearing surfaces or treads 13, which rest squarely upon the flat tops 14 of the rails 15 and have no tendency to spread or separate the rails while running over them, and there will be less friction between this form of wheel and the rails than between the wheels and rails as usually made. The truck will therefore run easier and there will be less wear on both the wheels and the rails.

I claim as my invention—

1. A car-truck comprising channel-bar-iron side rails 2 and 3, arranged in pairs on each side of the truck with a space between the rails of each pair, cross-bars 4 also of channel bar-iron, connecting the ends of said side rails, brackets 5 provided in the angle formed by said cross-bars and the inner rails of said pairs and securing them together, braces or truss-rods 6 having their ends bolted to the inner side rails near said brackets 5 and extending lengthwise of the truck between said rails and secured together near the middle of the truck, a bolster 7 provided above said truss-rods near the middle of the same and wheels arranged in the spaces between the rails of each pair and having axles journaled in boxes secured to said side rails, whereby independent movement of said wheels is permitted, to facilitate the passing of the truck around a curve.

2. A car-truck having side rails composed of channel bar-iron arranged in pairs with spaces between the rails of each pair, cross-bars connecting said side rails, truss-rods bolted to the inner rail of each pair and secured together near the middle of the truck, a bolster having springs located above said truss-rods and centrally on the truck, boxes bolted to the outer faces of the outer rails of each pair and the inner faces of the inner rails of said pairs and wheels having axles journaled in said boxes and movable independently of one another, substantially as described.

In witness whereof I have hereunto set my hand this 31st day of August, 1905.

READ RUSSELL.

Witnesses:
 A. H. HOSKEN,
 GEORGE W. WALTER.